(12) United States Patent
Fujiwara et al.

(10) Patent No.: US 7,714,595 B2
(45) Date of Patent: May 11, 2010

(54) FOREIGN OBJECT DETECTION SENSOR

(75) Inventors: Toshio Fujiwara, Kosai (JP); Masaaki Shimizu, Toyohashi (JP)

(73) Assignee: ASMO Co., Ltd. (JP)

( * ) Notice: Subject to any disclaimer, the term of this patent is extended or adjusted under 35 U.S.C. 154(b) by 136 days.

(21) Appl. No.: 12/023,999

(22) Filed: Jan. 31, 2008

(65) Prior Publication Data

US 2008/0180114 A1     Jul. 31, 2008

(30) Foreign Application Priority Data

Jan. 31, 2007 (JP) .............................. 2007-021406

(51) Int. Cl.
*G01R 27/26* (2006.01)
(52) U.S. Cl. ...................................... 324/663
(58) Field of Classification Search .................. 324/663
See application file for complete search history.

(56) References Cited

U.S. PATENT DOCUMENTS

| | | | |
|---|---|---|---|
| 6,316,846 B1* | 11/2001 | Kashiwazaki et al. ....... | 307/119 |
| 7,055,885 B2* | 6/2006 | Ishihara et al. ........... | 296/146.4 |
| 7,534,957 B2* | 5/2009 | Yamaura et al. .............. | 174/36 |
| 2001/0017587 A1* | 8/2001 | Suzuki et al. ............. | 340/545.7 |
| 2005/0111318 A1 | 5/2005 | Nakajima et al. | |

FOREIGN PATENT DOCUMENTS

| | | |
|---|---|---|
| JP | 2002-148003 | 5/2002 |
| JP | 2004-086702 | 3/2004 |
| JP | 2005-158239 | 6/2005 |
| JP | 2006162374 | 6/2006 |
| JP | 2006-310211 | 11/2006 |
| JP | 2006-339013 | 12/2006 |

OTHER PUBLICATIONS

JP2007-021406, filed Jan. 31, 2007 Japan Patent Office; Office Action (2 pages).

* cited by examiner

*Primary Examiner*—Amy He
(74) *Attorney, Agent, or Firm*—Fulwider Patton LLP

(57) ABSTRACT

A foreign object detection sensor applied to an electric sliding door apparatus is provided. The sensor includes a contact detecting section, a change detecting section, and a determination section. The contact detection section has a pressure sensitive portion which is capable of elastically changing in form through contact with a foreign object. The contact detecting section outputs a contact detection signal. The change detecting section measures the time required for the oscillation signal for a predetermined number of cycles to be outputted within a measurement period, which is set shorter than the response time it takes from when the object makes contact with the pressure sensitive portion to when the contact detecting section outputs the contact detection signal in the case where the movable body is in the closing operation at a predetermined maximum moving speed.

6 Claims, 7 Drawing Sheets

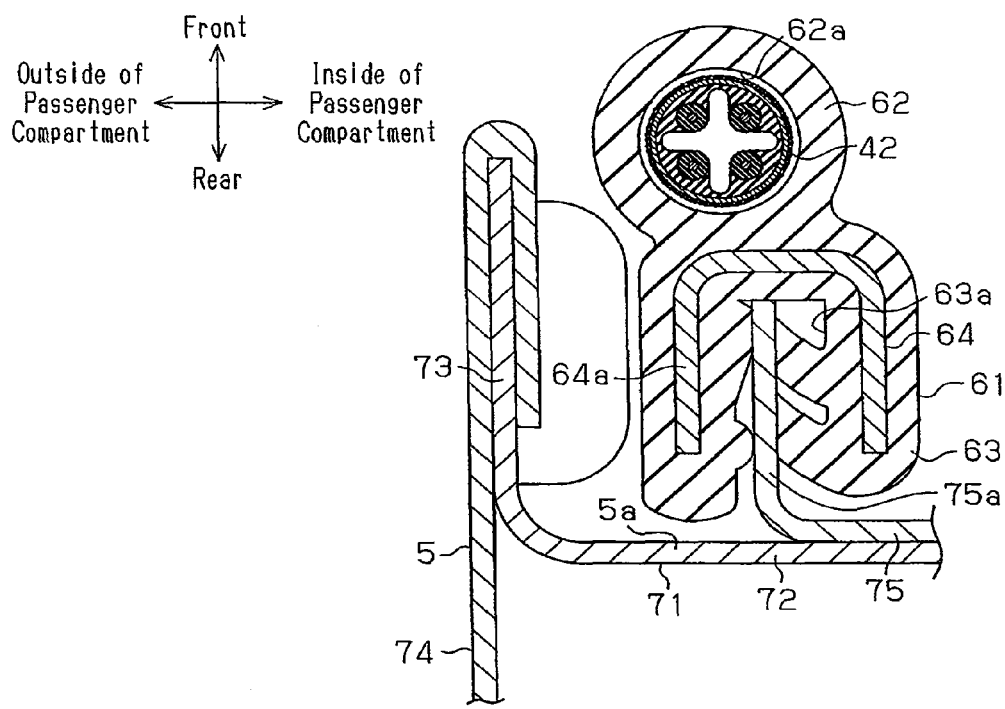
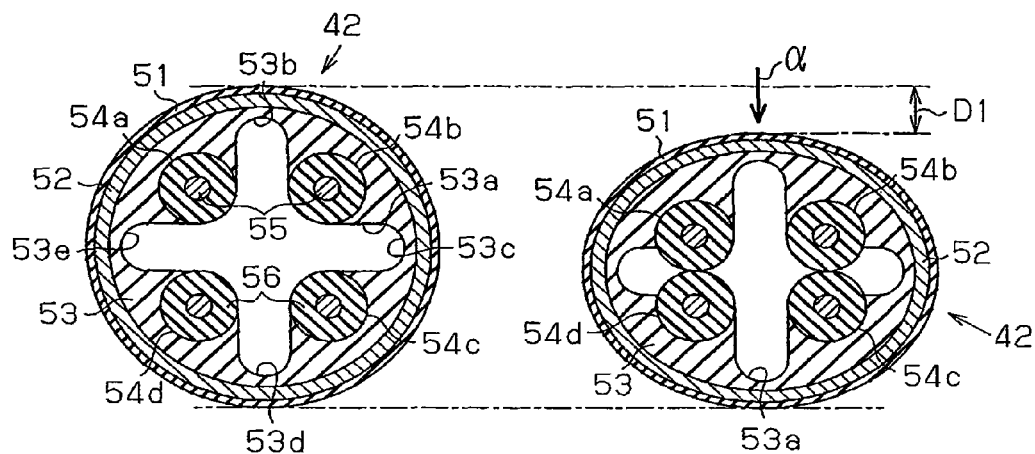

FOREIGN OBJECT DETECTION SENSOR

BACKGROUND OF THE INVENTION

The present invention relates to a foreign object detection sensor for determining whether there is a foreign object in the proximity of a sensor electrode.

Some conventional vehicles are provided with an electric sliding door apparatus for moving and sliding a door panel (movable body) provided on a side of the vehicle in the front-rear direction of the vehicle using the drive force of a motor or the like. Such sliding door apparatuses are provided with a foreign object detection sensor, such as that described in, for example, Japanese Laid-Open Patent Publication No. 2006-162374, so that foreign objects between the front end portion of the door panel and a peripheral portion of a door opening for passengers to get in and out of the body of the vehicle (opening portion) can be detected during the closing operation of the door panel.

The foreign object detection sensor described in the above described publication has a sensor electrode (antenna), an oscillator, a detection portion, and a determination section. The sensor electrode is placed along the front end portion of the door panel. This sensor electrode detects the capacitance between the sensor electrode and a foreign object in the proximity of the sensor electrode. An oscillating circuit oscillates at an oscillation frequency determined in accordance with the capacitance detected using the sensor electrode. The detection portion detects the above described oscillation frequency. The determination section determines whether there is a foreign object in the proximity of the sensor electrode, that is to say, whether there is a foreign object between the front end portion of the door panel and the peripheral portion of the door opening on the basis of the oscillation frequency detected by the detection portion. Specifically, the determination section determines that there is a foreign object in the proximity of the sensor electrode in the case where the amount of change (or inclination of change) in the oscillation frequency detected by the detection portion exceeds a preset reference value.

The foreign object detection sensor detects the amount of change in the above described oscillation frequency whenever a predetermined period of time elapses or whenever the door panel moves by a predetermined distance. In the case where an amount of change in the oscillation frequency is detected whenever a predetermined period of time elapses, the foreign object detection sensor measures values in the waveform outputted from the oscillation circuit at a first time and a second time within a predetermined period of time, and detects the amount of change in the oscillation frequency on the basis of the results of this measurement. Meanwhile, in the case where the amount of change in the oscillation frequency is detected whenever the door panel moves by a predetermined distance, the foreign object detection sensor generally measures the period in terms of the length of one wave in the waveform outputted from the oscillating circuit when the door panel moves by a predetermined distance, and detects the amount of change in the oscillation frequency on the basis of the results of this measurement.

In the case where the amount of change in the oscillation frequency is detected on the basis of the values in the waveform outputted from the oscillating circuit at the first time and the second time within the predetermined period of time, the number of cycles of the waveform outputted within the predetermined period of time changes. Therefore, there is inconsistency in the precision of the amount of change in the oscillation frequency gained for the predetermined period of time. The oscillation frequency in the oscillating circuit changes in accordance with the change in the capacitance detected using the sensor electrode, and therefore, in some cases, the number of cycles in the waveform outputted from the oscillating circuit within a predetermined period of time does not become a natural number. In such cases, the amount of change in the oscillation frequency gained for every predetermined period of time ends up having low precision.

Meanwhile, in accordance with the method for measuring the cycle in terms of the length of one wave in the waveform outputted from the oscillating circuit whenever the door panel moves by a predetermined distance, there is a risk that there may be inconsistency between the result of measurement and the actual value in the case of a measuring method with low precision.

As described above, there is a risk in the foreign object detection sensor described in Patent Document 1 that the precision in detection of the amount of change in the oscillation frequency on the basis of the waveform outputted from the oscillating circuit may be low. That is to say, there is a risk that the precision in the detection of the capacitance by the sensor electrode may be low, and the precision in the detection of foreign objects in the proximity of the sensor electrode may be low.

SUMMARY OF THE INVENTION

An objective of the present invention is to provide a foreign object detection sensor that improves the precision in capacitance detected by a sensor electrode can be increased.

To achieve the above objective and in accordance with one aspect of the present invention, a foreign object detection sensor applied to an opening and closing apparatus is provided. The opening and closing apparatus includes a movable body for opening and closing an opening created in a stationary body. The movable body has a closing end portion, which is the front side of the movable body relative to the direction of movement at the time of the closing operation. The opening has a facing portion which faces the closing end portion. The foreign object detection sensor includes a sensor electrode placed in the closing end portion, an oscillating section, a contact detecting section, a change detecting section, and a determination section. The oscillating section outputs an oscillation signal having an oscillation frequency which is set in accordance with the capacitance between the sensor electrode and an conductive foreign object in close proximity to the sensor electrode. The contact detecting section is placed in the closing end portion and has a pressure sensitive portion which is capable of elastically changing in form through contact with a foreign object. The contact detecting section outputs a contact detection signal when the pressure sensitive portion elastically changes in form by a predetermined amount. The change detecting section detects a change in the oscillation frequency on the basis of the oscillation signal. The change detecting section measures the time required for the oscillation signal for a predetermined number of cycles, which number is two or greater, to be outputted within a measurement period, which is set shorter than the response time it takes from when the object makes contact with the pressure sensitive portion to when the contact detecting section outputs the contact detection signal in the case where the movable body is in the closing operation at a predetermined maximum moving speed. The detecting section outputs the result of measurement whenever the measurement period elapses. The determination section determines whether there is a foreign object between the closing end portion and the facing portion on the basis of a result of measurement by the change detecting section. The determination section determines that there is a foreign object between the closing end portion and the facing portion when the contact detection signal is inputted into the determination section.

In accordance with another aspect of the present invention, a foreign object detecting method applied to an opening and closing apparatus is provided. The opening and closing apparatus includes a movable body for opening and closing an opening created in a stationary body. The movable body has a closing end portion, which is the front side of the movable body relative to the direction of movement at the time of the closing operation, and the opening has a facing portion which faces the closing end portion. The object detecting method includes: outputting an oscillation signal having an oscillation frequency which is set in accordance with the capacitance between a sensor electrode placed in the closing end portion and a conductive foreign object in close proximity to the sensor electrode; outputting a contact detection signal when a pressure sensitive portion, which is placed in the closing end portion and is capable of elastically changing in form through contact with a foreign object, elastically changes in form by a predetermined amount; measuring the time required for the oscillation signal for a predetermined number of cycles, which number is two or greater, to be outputted within a measurement period, which is set shorter than the response time it takes from when the object makes contact with the pressure sensitive portion to when the contact detection signal is outputted in the case where the movable body is in the closing operation at a predetermined maximum moving speed, and outputting the result whenever the measurement period elapses; determining whether there is a foreign object between the closing end portion and the facing portion on the basis of the result of measurement; and determining that there is a foreign object between the closing end portion and the facing portion when the contact detection signal is outputted.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 4A is a cross-sectional view showing the vicinity of the front end portion of the door panel provided in the vehicle of FIG. 1;

FIG. 4B is a cross-sectional view showing the main body of the sensor attached to the door panel;

FIG. 4C is a cross-sectional view showing the main body of the sensor when a pressing force is applied to the main body of the sensor of FIG. 4B;

DETAILED DESCRIPTION OF THE PREFERRED EMBODIMENTS

In the following, one embodiment according to the present invention is described in reference to the drawings.

Figure 1:
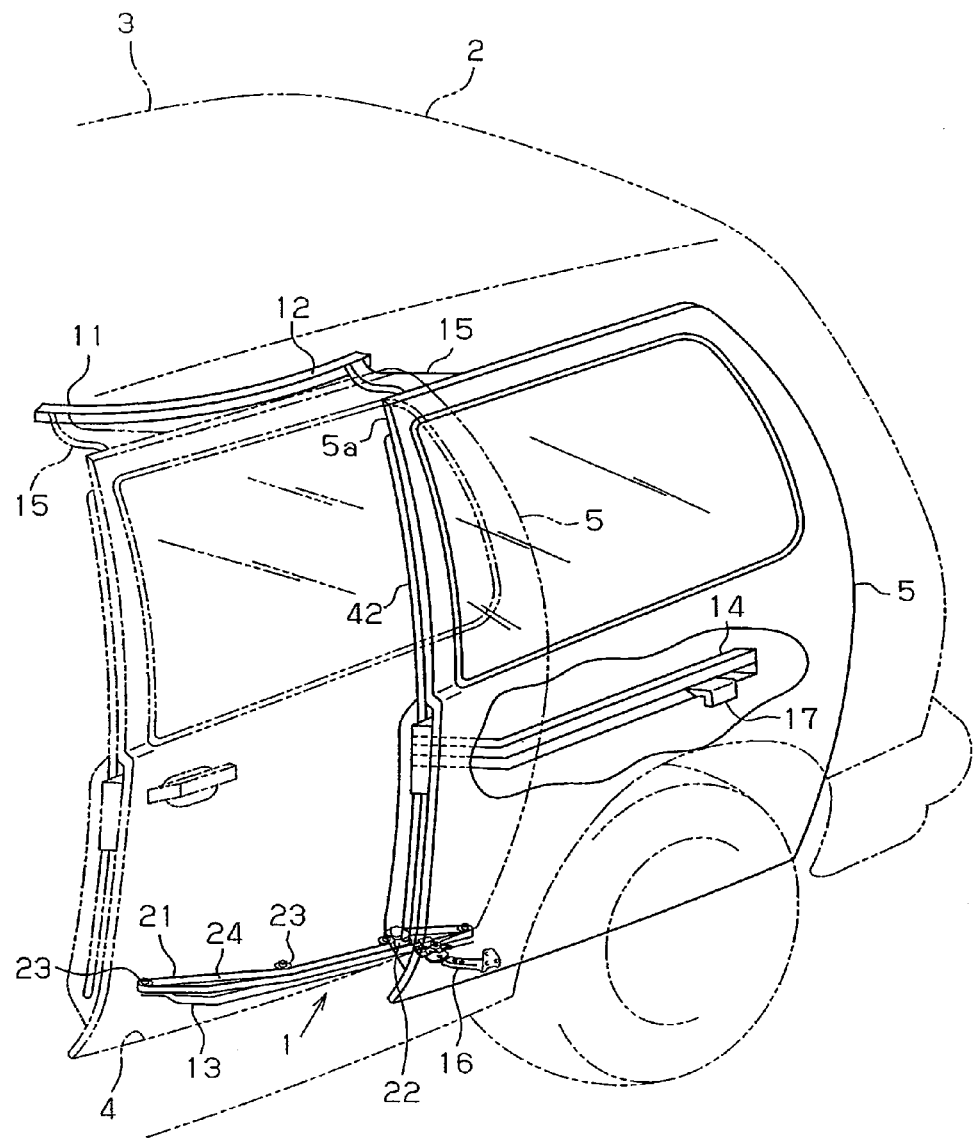
FIG. 1 is a perspective view showing a vehicle provided with an electric sliding door apparatus according to one embodiment of the present invention.
Figure 2:
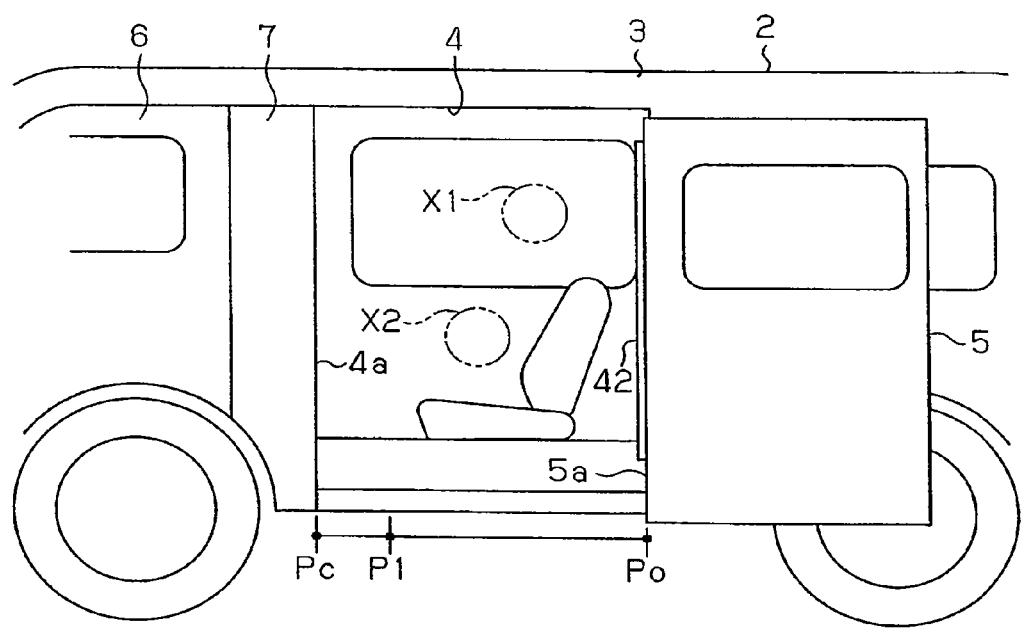
FIG. 2 is a side view showing the vehicle of FIG. 1.

FIG. 1 shows a vehicle 2, on which an electric sliding door apparatus 1 is mounted as an opening and closing apparatus. As shown in FIG. 1, the vehicle 2 is provided with a vehicle body 3, which is a solid body made of a conductive metal material, and a door opening 4 for passengers to get in and out is created on the left side of the vehicle body 3 as a rectangular opening. The door opening 4 is opened and closed with a rear side door panel 5 formed of a conductive metal material. The rear side door panel 5, which is a rectangular movable body, corresponds to the form of the door opening 4. As shown in FIG. 2, a front side door panel 6 having conductivity is provided to the front of the door opening 4. A center pillar 7 having conductivity and extending in the up-down direction is provided between the front side door panel 6 and the rear side door panel 5 in a state where the door opening 4 is closed.

As shown in FIG. 1, the rear side door panel 5 is attached to the vehicle body 3 with an operation mechanism 11 in such a manner as to be moveable substantially in the front-rear direction, and open and close the door opening 4. A locking mechanism (not shown), such as a latch is provided in the door panel 5. In a state where the door panel 5 closes the door opening 4, that is to say, in a state where the door panel 5 is positioned in a completely closed position, this locking mechanism immovably secures the door panel 5 relative to the vehicle body 3. A half latch detecting section (not shown) is provided in the locking mechanism. This half latch detecting section outputs a half latch detection signal to the control circuit device 101 (see FIG. 3) of the electric sliding door apparatus 1 when the locking mechanism becomes of a half latched state.

The above described operating mechanism 11 is formed of an upper rail 12, a lower rail 13, and a center rail 14 provided in the vehicle body 3, and an upper arm 15, a lower arm 16, and a center arm 17 provided in the door panel 5.

The upper rail 12 and the lower rail 13 are provided in the upper portion and the lower portion of the door opening 4 in the vehicle 2, respectively, and extend substantially in the front-rear direction of the vehicle 2. The center rail 14 is provided substantially in the center portion in the up-down direction, to the rear of the door opening 4, in the vehicle 2, and extends substantially in the front-rear direction of the vehicle 2. The front portions of the respective rails 12 to 14 curve toward the inside of the passenger compartment.

The above described arms 15 to 17 are respectively secured in the upper portion, the lower portion and a side of the center portion of the door panel 5 inside the passenger compartment. The upper arm 15, the lower arm 16 and the center arm 17 are connected to the above described upper rail 12, the above described lower rail 13 and the above described center rail 14, respectively. The respective arms 15 to 17 are guided by the corresponding rails 12 to 14 in such a manner as to be movable in the front-rear direction of the vehicle 2.

The above described lower arm 16 is driven in the front-rear direction by a driving mechanism 21. Specifically, the driving mechanism 21 is provided with a drive pulley 22 which rotates around an axis extending in the up-down direction of the vehicle 2, and a plurality of driven pulleys 23 at positions inward of the lower rail 13 in the passenger compartment. An endless belt 24 is engaged with the drive pulley 22 and the driven pulleys 23. The end portion of the above described lower arm 16 is secured to this endless belt 24.

Figure 3:
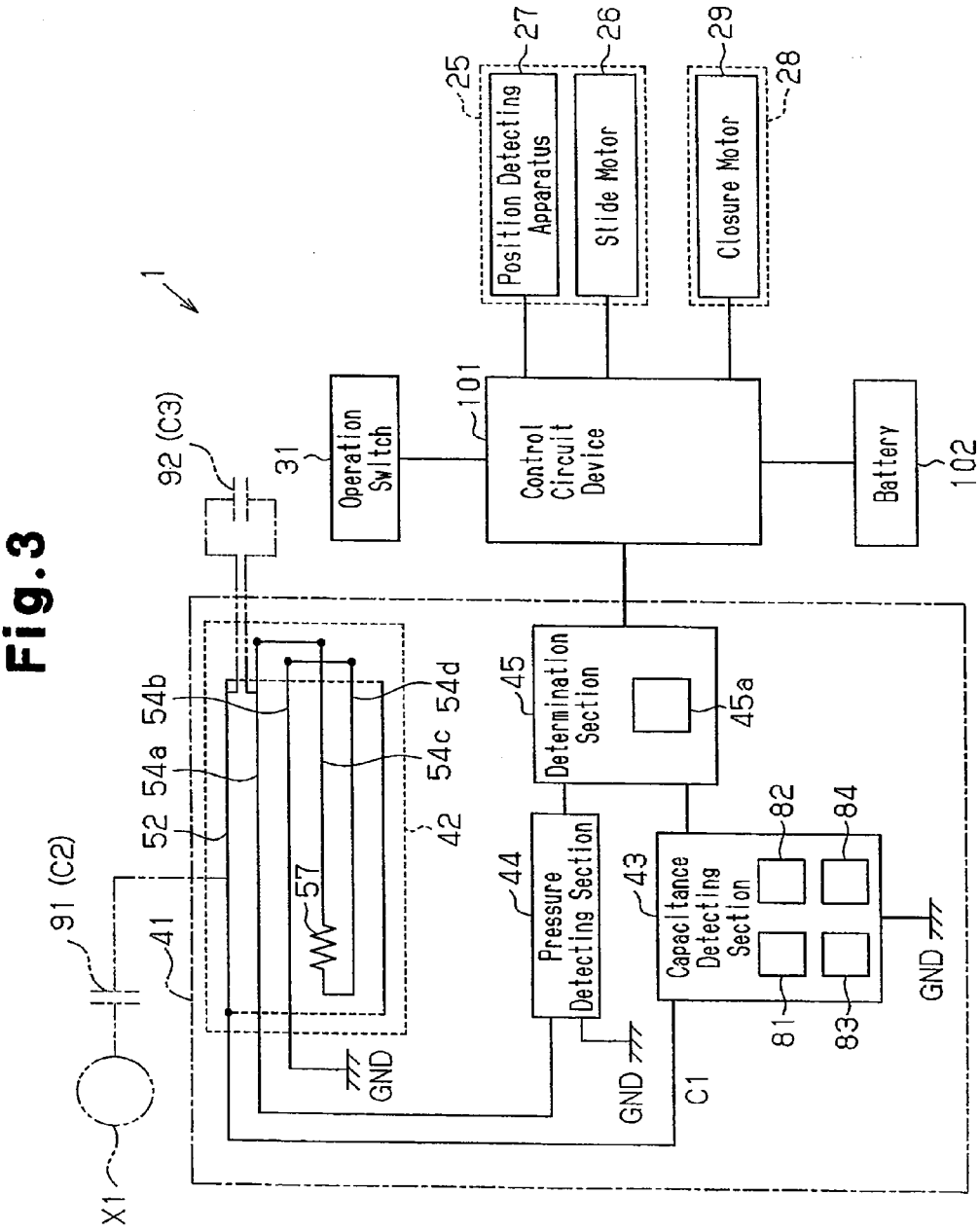
FIG. 3 is a block diagram showing the electrical configuration of the electric sliding door apparatus of FIG. 1.
Figure 5:
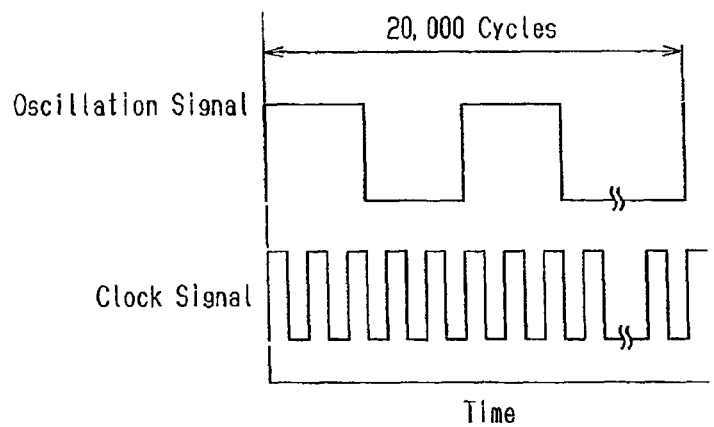
FIG. 5 is a graph illustrating the manner in which the time of a predetermined number of cycles of an oscillating signal is measured.

As shown in FIGS. 1 and 3, the driving mechanism 21 is provided with a slide actuator 25 which is connected to the drive pulley 22. The slide actuator 25 is placed inside the passenger compartment. The slide actuator 25 is provided with a slide motor 26 and a reduction gear mechanism (not shown) for reducing the speed of rotation of the slide motor 26, which is thus transmitted to the above described drive pulley 22. When the slide motor 26 is driven, the drive pulley 22 rotates. Then, the endless belt 24 rotates and the above described lower arm 16 moves in the front-rear direction. As a result, the above described door panel 5 slides in the front-rear direction.

A position detecting device 27, which is a position detecting section for detecting the rotation of the slide motor 26, is provided within the above described slide actuator 25. The position detecting device 27 outputs a position detection signal which corresponds to the rotation of the slide motor 26 to the above described control circuit device 101. The position detecting device 27 is provided with, for example, a permanent magnet (not shown) which rotates together with the rotary shaft (not shown) of the slide motor 26 or the reduction gears (not shown) which form the above described reduction gear mechanism, and a Hall IC (not shown) placed so as to face the permanent magnet. The position detecting device 27 outputs a pulse signal in accordance with change in the magnetic field of the permanent magnet caused by to the rotation of the permanent magnet as a position detection signal. The door panel 5 is operated by the slide motor 26, and therefore, the position detection signal is a signal indicating the position of the door panel 5. The potential level of the position detection signal is switched from the H (high potential) level to the L (low potential) level or from the L level to the H level whenever the door panel 5 moves by a predetermined distance.

The driving mechanism 21 is provided with a closure actuator 28 which is placed inside the above described door panel 5. The closure actuator 28 is provided with a closure motor 29 and a gear reduction mechanism (not shown) for reducing the rotation of the motor 29. When the closure motor 29 is driven, the door panel 5 moves to such a position that it is possible for the above described locking mechanism to lock.

The electric sliding door apparatus 1 is provided with an operation switch 31 which is electrically connected to the control circuit device 101. When this operation switch 31 is operated by a passenger in the vehicle 2 so that the door opening 4 is opened, the operation switch 31 outputs an opening signal to the control circuit device 101 so that the door panel 5 slides, and the door opening 4 opens. Meanwhile, when the operation switch 31 is operated by a passenger so that the door opening 4 closes, the operation switch 31 outputs a closing signal to the control circuit device 101 so that the door panel 5 slides, and the door opening 4 closes. This operation switch 31 is provided in a predetermined portion (dashboard or the like) within the passenger compartment, on a side of the door panel 5 inside the passenger compartment, a portable item (not shown) carried together with the ignition key or the like.

As shown in FIGS. 2 and 3, the electric sliding door apparatus 1 is provided with a foreign object detection sensor 41 for detecting a foreign object X1 having conductivity and a foreign object X2 having no conductivity between the door panel 5 and the door opening 4. As shown in FIG. 3, the foreign object detection sensor 41 is provided with the main sensor body 42, a capacitance detecting section 43, a pressure detecting section 44 and a determination section 45.

As shown in FIGS. 1 and 4A, the main sensor body 42 is elongated. The main sensor body 42 is provided in a front portion of the door panel 5 in the direction of movement during the closing operation, that is to say, in the front end portion 5a of the door panel 5, which is a closing end portion, so as to extend in the up-down direction of the front end portion 5a. The length of the main sensor body 42 is substantially equal to the length of the front end portion 5a in the up-down direction. As shown in FIG. 4B, the main sensor body 42 has an external cover 51 which is formed of a material having insulating properties, and of which the form is elastically changeable. The external cover 51 is in long, cylindrical form. The main sensor body 42 is provided with an outer electrode 52, which is a sensor electrode in substantially cylindrical form provided inside the external cover 51, and an insulating layer 53 provided inside this outer electrode 52. The outer electrode 52 is formed of a plurality of leading wires wound around the outer periphery of the insulating layer 53 in helix form. As shown in FIG. 3, the outer electrode 52 is electrically connected to the above described capacitance detecting section 43.

The insulating layer 53 is formed of a material having insulating properties and elasticity, such as a soft synthetic resin material or rubber. The length of the insulating layer 53 is substantially equal to that of the above described external cover 51. The insulating layer 53 is in cylindrical form. A hole 53a is created in the center portion in the direction of the diameter of the insulating layer 53 so as to extend in the longitudinal direction of the insulating layer 53. The hole 53a is in cross form in a cross section of the insulating layer 53 perpendicular to the longitudinal direction, and includes four recesses 53b to 53e. The recesses 53b to 53e are connected to each other in the center portion of the insulating layer 53 in the direction of the diameter, and extend outward in the direction of the diameter. The hole 53a extends in the longitudinal direction of the insulating layer 53, so that the four recesses 53b to 53e are respectively in helix form.

A first electrode wire 54a to a fourth electrode wire 54d which are held by the insulating layer 53 are placed inside the insulating layer 53. The respective electrode wires 54a to 54d are provided with a center electrode 55 which is formed by twisting conductive fine wires and has flexibility, and a coating layer 56 in cylindrical form for coating the center electrode 55. The coating layer 56 has conductivity and elasticity. The respective electrode wires 54a to 54d are placed between adjacent recesses 53b to 53e, one between each two, and extend along the recesses 53b to 53e in helix form. No less than half of the surface of the respective electrode wires 54a to 54d is buried inside the insulating layer 53.

As shown in FIG. 3, the first electrode wire 54a and the third electrode wire 54c are electrically connected at one end (end portion on the right in FIG. 3) in the longitudinal direction, and the second electrode wire 54b and the fourth electrode wire 54d are electrically connected at one end (end portion on the right in FIG. 3) in the longitudinal direction. The third electrode wire 54c and the fourth electrode wire 54d are electrically connected at the other end (end portion on the left in FIG. 3) in the longitudinal direction via a resistor 57. The other end of the second electrode wire 54b (end portion on the left in FIG. 3) in the longitudinal direction is grounded (connected to the ground GND). The other end of the first electrode wire 54a (end portion on the left in FIG. 3) in the longitudinal direction is electrically connected to the pressure detecting section 44. Thus, electricity is supplied to the first electrode wire 54a via the control circuit device 101 and the pressure detecting section 44.

As shown in FIG. 4A, the main sensor body 42, which is formed as described above, is held by a protector 61, and at the same time, secured to the front end portion 5a of the door panel 5 with the protector 61. This protector 61 is formed of a support portion 62 for holding the main sensor body 42 and an attachment portion 63 for securing the protector 61 to the front end portion 5a of the door panel 5, which are integrated with each other.

The attachment portion 63 is formed of a reinforcing member 64 which is coated with an insulating resin material, for example an elastomer or rubber. The reinforcing member 64 is formed of a great number of conductive skeletal members 64a of which the cross section is in U form, which are connected in the up-down direction of the vehicle 2. An attachment groove 63a is created in a portion of the attachment portion 63 which becomes the inside of the skeletal members 64a, so as to extend in the longitudinal direction of the attachment portion 63. The length of the attachment portion 63 in the longitudinal direction is substantially equal to the length of the main sensor body 42 in the axial direction. The support portion 62 in cylindrical form is formed so as to be integrated with the above described attachment portion 63, and placed on the side opposite to the opening of the above described attachment groove 63a as viewed in the axial direction. The length of this support portion 62 in the axial direction is substantially equal to the length of the axial direction of the main sensor body 42. An insertion hole 62a is created inside the support portion 62 so as to extend in the axial direction of the support portion 62. The inner diameter of the insertion hole 62a is slightly larger than the outer diameter of the main sensor body 42. The protector 61 is secured to the front end portion 5a of the door panel 5 in a state where the main sensor body 42 is inserted in the insertion hole 62a.

The door panel 5 is provided with an inner plate 71 which is on the inner side of the vehicle and an outer plate 74 which is on the outer side of the vehicle. A fixed portion 72 which extends substantially parallel to the direction of the width of the vehicle and an extending portion 73 which extends toward the front side of the vehicle 2 from the end portion of the fixed portion 72 on the outer side of the passenger compartment are formed on the front end portion (end portion on the front side of the vehicle 2) of the inner plate 71. The end of the extending portion 73 is covered by the outer plate 74 of the door panel 5. A bracket 75 having a main bracket body 75a which extends toward the front side of the vehicle 2 is secured on the surface on the front side of the vehicle 2 in the above described fixed portion 72. This bracket 75 extends in the up-down direction of the vehicle 2. When the main bracket body 75a is compressed and inserted in the above described attachment groove 63a, the protector 61 is secured to the main bracket body 75a, that is to say, the front end portion 5a of the door panel 5.

In a state where the main sensor body 42 is secured to the door panel 5 with the protector 61, the main sensor body 42 sits along the front end portion 5a of the door panel 5, and at the same time, protrudes toward the front of the vehicle 2 from the end of the above described extending portion 73 (including the outer plate 74 which covers the extending portion 73). As shown in FIG. 4C, when a pressing force is applied to the main sensor body 42, for example in the direction of arrow α, the support portion 62 (see FIG. 4A), the external cover 51, the outer electrode 52 and the insulating layer 53 elastically change in form. In the case where a pressing force which can change the form of the hole 53a is applied to the insulating layer 53 of the main sensor body 42 at this time, either the first electrode wire 54a or the third electrode wire 54c makes contact with either the facing second electrode wire 54b or the fourth electrode wire 54d so that the two are electrically connected. When the pressing force is cancelled, the support portion 62 (see FIG. 4A), the external cover 51, the outer electrode 52 and the insulating layer 53 recover their form, as do the first electrode wire 54a to the fourth electrode wire 54d. As a result of this, the electrical connection between the first electrode wire 54a and the fourth electrode wire 54d or between the second electrode wire 54b and the third electrode wire 54c is broken.

As shown in FIG. 3, the above described pressure detecting section 44, the insulating layer 53, the electrode wires 54a to 54d and the resistor 57 form a contact type sensor for detecting a foreign object X1 or a foreign object X2 between the facing portion 4a which faces the front end portion 5a of the door panel 5 and the front end portion 5a of the door panel 5 in the periphery of the door opening 4. This pressure detecting section 44 is grounded (connected to the ground GND).

As shown in FIG. 4B, in a state where no pressing force is applied to the main sensor body 42, the current supplied to the first electrode wire 54a flows through the first electrode wire 54c, the resistor 57, the fourth electrode wire 54d and the second electrode wire 54b in this order. As shown in FIG. 4C, when a pressing force is applied to the main sensor body 42, the support portion 62 (see FIG. 4A), the external cover 51, the outer electrode 52 and the insulating layer 53 elastically change in form. As a result, either the first electrode wire 54a or the third electrode wire 54c makes contact with either the second electrode wire 54b or the fourth electrode wire 54d, so that the two are electrically connected to each other. Then, the current supplied to the first electrode wire 54a flows through the second electrode wire 54b without passing through the resistor 57. Accordingly, the voltage value between the electrode wire 54a and the ground GND when no pressing force is applied to the main sensor body 42 is different from that when a pressing force is applied to the main sensor body 42. The pressure detecting section 44 detects change in the voltage value between the electrode wire 54a and the ground GND, and outputs a voltage detection signal indicating the change in the voltage value, that is to say, a contact detection signal, to the determination section 45. The pressure detecting section 44 has a threshold value which is set on the basis of, for example, the voltage value between the electrode wire 54a and the ground GND, in a state where pressing force is applied to the main sensor body 42, and outputs a voltage detection signal in the case where the voltage value between the electrode wire 54a and the ground GND exceeds the threshold value.

As shown in FIG. 4C, the main sensor body 42 is formed in such a manner that either the first electrode wire 54a or the third electrode wire 54c makes contact with either the second electrode wire 54b or the fourth electrode wire 54d, so that the two are electrically connected to each other when a pressing force is applied to the main sensor body 42, which then changes in form by a predetermined amount of change D1 in the direction of the diameter. According to the present embodiment, this amount of change D1 is set to 2 mm.

As shown in FIG. 3, the above described capacitance detecting section 43 is placed inside the door panel 5 (see FIG. 1). The above described capacitance detecting section 43 is connected to the ground GND. The capacitance detecting section 43 is provided with an oscillating circuit 81, which is an oscillating section, a first counter 82, a reference clock generating circuit 83 and a second counter 84.

The oscillating circuit 81 is, for example, a Colpitts oscillating circuit. The oscillating circuit 81 oscillates at an oscillation frequency in accordance with the capacitance C1 detected using the outer electrode 52, and at the same time, outputs an oscillating signal of this oscillation frequency. The capacitance C1 detected using the outer electrode 52 is a value synthesized from the capacitance C2 of the capacitor 91, which is formed of a conductive foreign object X1 (or the ground) in the proximity of the main sensor body 42 and the outer electrode 52, and the capacitance C3 of the capacitor 92, which is formed of the outer electrode 52 and the electrode wire 54a. Accordingly, when the foreign object X1 comes close to the main sensor body 42, the capacitance C2 between the outer electrode 52 and the foreign object X1 increases, and therefore, the capacitance C1 detected by the capacitance detecting section 43 increases. The oscillating signal outputted from the oscillating circuit 81 is a digitalized pulse signal. The above described first counter 82 measures the number of times that the oscillating signal outputted by the oscillating circuit 81 rises.

The above described reference clock generating circuit 83 outputs a clock signal of a predetermined clock frequency. The above described second counter 84 measures the number of times that this clock signal rises. According to the present embodiment, the clock frequency is set to 25 MHz.

Figure 6:
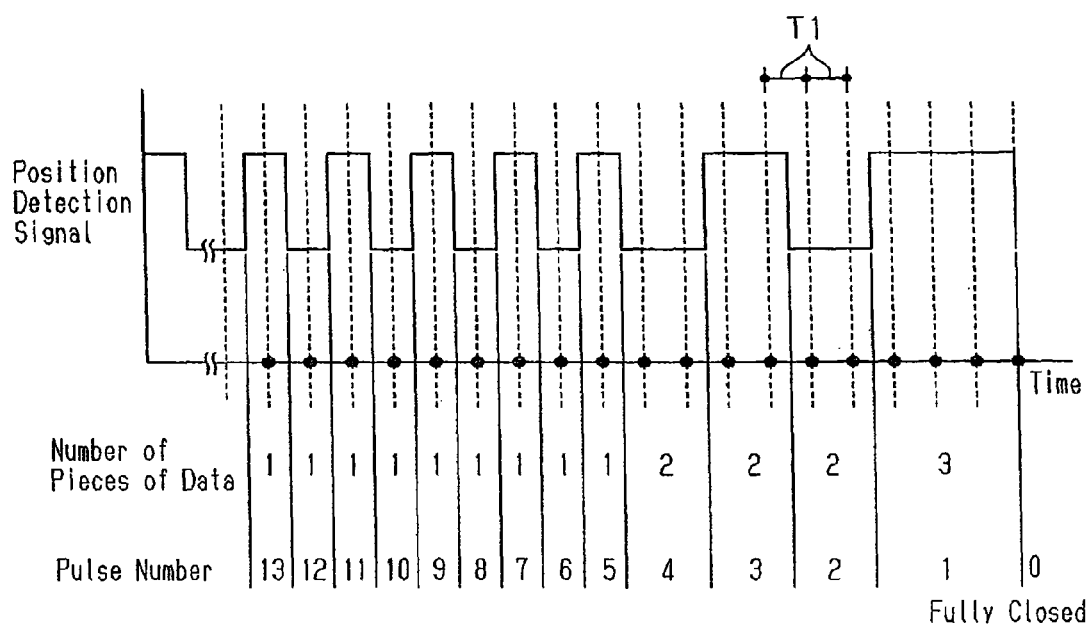
FIG. 6 is a diagram illustrating the measurement period and the pulse number in a position detection signal.

The capacitance detecting section 43 is provided with an oscillating circuit 81, a first counter 82, a reference clock generating circuit 83 and a second counter 84. The capacitance detecting section 43 measures the time that is required for an oscillating signal for a predetermined number of cycles to be outputted within a predetermined measurement period T1 and outputs this result of the measurement to a determination section 45 whenever the measurement period T1 elapses, as shown in FIG. 6. In FIG. 6, the time when the result of the measurement is outputted is indicated by black dots. According to the present embodiment, the time required for an oscillating signal for 20,000 cycles to be outputted is measured within the measurement period T1, which is set to 6.5 ms in the capacitance detecting section 43. Specifically, as shown in FIG. 3, in the capacitance detecting section 43, the first counter 82 measures the number of times that the oscillating signal rises to 20,000, and at the same time, the second counter 84 measures the number of times that the clock signal outputted from the reference clock generating circuit 83 rises while the oscillating signal for 20,000 cycles is being outputted, and thus, measures the time it takes for the oscillating signal for 20,000 cycles to be outputted. The capacitance detecting section 43 outputs the number of times that the clock signal corresponding to the oscillating signal for 20,000 cycles rises, which has been measured by the second counter 84, to the determination section 45 for every predetermined measurement period T1 as the result of measurement. The capacitance detecting section 43 newly measures the number of times that the clock signal corresponding to the oscillating signal for 20,000 cycles rises whenever the result of measurement is outputted.

In the case where the door panel 5 is moving at the maximum moving speed, the above described measurement period T1 is set to a period shorter than the time from when the pulse of the position detection signal outputted from the position detecting device 27 rises to when it falls, or the time from when the pulse of the position detection signal falls to when it rises. In the case where the door panel 5 is in the closing operation at the maximum moving speed, the measurement period T1 is set to be shorter than the response time T2 from when a foreign object X1 or a foreign object X2 makes contact with the support portion 62 (see FIG. 4A) for holding the main sensor body 42 to when the pressure detecting section 44 outputs a voltage detection signal. At the time of contact, the main sensor body 42 does not change its form. In the electric sliding door apparatus 1 according to the present embodiment, the maximum moving speed of the door panel 5 is set at 250 mm/s. Thus, the pressure detecting section 44 outputs a voltage detection signal when the main sensor body 42 changes its form by the above described amount of change D1, which is 2 mm, and therefore, the response time T2 becomes the time which is required for the door panel 5 in the closing operation at the maximum moving speed of 250 mm/s to move 2 mm. Accordingly, the response time T2 in the present embodiment is 8 ms. Therefore, according to the present embodiment, the measurement period T1 is set to 6.5 ms, which is shorter than 8 ms.

It was found from experiments that the oscillating circuit 81 stably oscillates at the frequency where the capacitance C1 detected using the outer electrode 52 becomes 250 pF in the case where there is no object X1 between the front end portion 5a of the door panel 5 and the door opening 4. In the oscillating circuit 81 according to the present embodiment, the resonant frequency is 3.2 MHz when the capacitance C1 is 250 pF. Accordingly, in the case where there is no object X1 between the front end portion 5a of the door panel 5 and the door opening 4, the oscillating circuit 81 outputs an oscillating signal for 20,800 cycles during the measurement period T1, which has been set to 6.5 ms. In order to detect the capacitance C1 with higher precision, it is desirable to sequentially measure the time during which an oscillating signal for a greater number of cycles is outputted. Accordingly, the number of cycles in the oscillating signal for measuring the time is set to 20,000 in the present embodiment in order to measure the time which is required for an oscillating signal for a greater number of cycles to be outputted within the measurement period T1.

It is desired to detect a change of 0.01 pF in the capacitance C1 detected using the outer electrode 52 in order to determine whether there is a conductive foreign object X1 between the front end portion 5a of the door panel 5 and the facing portion 4a of the door opening 4 with higher precision. In the case where the clock frequency of the above described reference clock generating circuit 83 was 25 MHz, the number of times that the clock signal corresponding to the oscillating single for 20,000 cycles rose changed by 34 clocks when the capacitance C1 detected using the outer electrode 52 was changed by 0.01 pF in the capacitance detecting section 43. Accordingly, when the clock frequency in the reference clock generating circuit 83 is set to 25 MHz, a precision of approximately 0.003 pF is ensured per clock in the clock signal. In this manner, when the clock frequency is set to 25 MHz, a change of 0.01 pF in the capacitance C1 detected using the outer electrode 52 is sufficiently detected.

Figure 7:
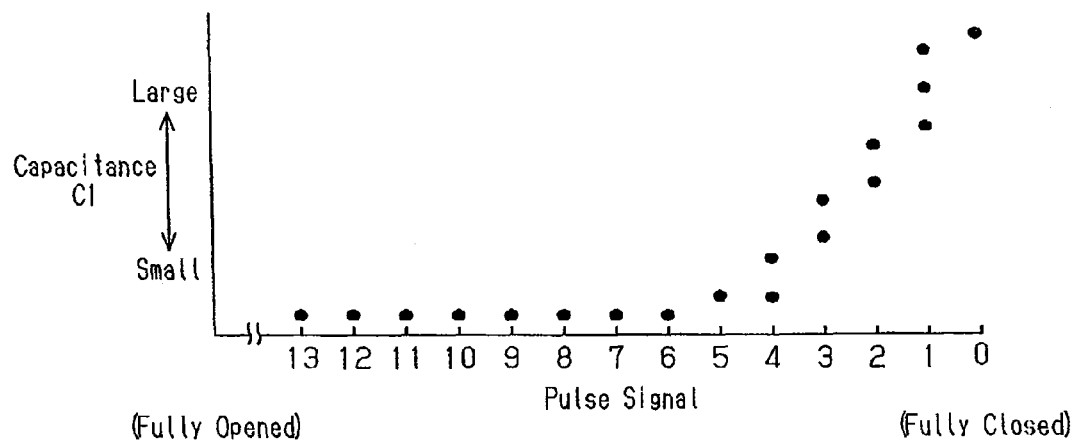
FIG. 7 is a graph illustrating the relationship between the pulse number in the position detection signal and the capacitance detected using an outer electrode.

The above described determination section 45 is provided with a memory section 45a. The memory section 45a stores the result of measurement outputted by the capacitance detecting section 43 for each measurement period T1, that is to say, the number of times that the clock signal corresponding to the oscillating signal for 20,000 cycles rises. As shown in FIG. 7, the memory section 45a stores the number of times that the clock signal outputted by the capacitance detecting section 43 rises in association with the pulse number of the position detection signal. In FIG. 7, a longitudinal axis represents the value of the capacitance C1 which is calculated on the basis of the result of measurement. According to the present embodiment, as shown in FIG. 6, the pulse number is increased or decreased whenever the position detection signal rises or falls. Specifically, the pulse number of the position detection signal is increased in the case where the door panel 5 moves from the completely closed position Pc to the completely open position Po and decreased in the case where the door panel 5 moves from the completely open position Po to the completely closed position Pc. The setting in the present embodiment is such that when the position detection signal rises immediately after the door panel 5 has started the opening operation from the completely closed position Pc, the pulse number is switched from "0" to "1." The result of measurement which has been inputted from the capacitance detecting section 43 when the pulse number of the position detection signal is "1" at the time of the closing operation of the door panel 5, for example, is stored in the memory section 45a so as to correspond to the pulse number "1." The potential level of the position detection signal switches whenever the door panel 5 moves by a predetermined distance. Therefore, the slower the speed of the door panel 5 is, the greater the number of results of measurement in association with one pulse number becomes. The determination section 45 detects the switching of the pulse numbers of the position detection signal, and thus, detects that the door panel 5 has moved by a predetermined distance.

Figure 8:
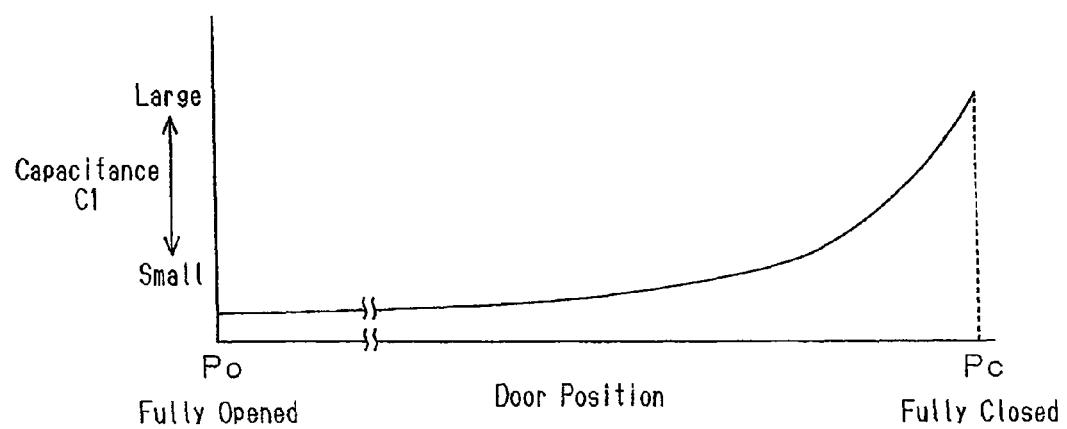
FIG. 8 is a graph showing the relationship between the position of the door panel and the capacitance detected using an outer electrode.

The determination section 45 has a threshold value for determining whether there is a conductive foreign object X1 in close proximity to the main sensor body 42. This threshold value is set in accordance with the number of times that the clock signal corresponding to the oscillating signal for 20,000 cycles rises, which is actually measured by the capacitance detecting section 43, in the case where the door panel 5 has initiated the closing operation in a state where there is no object X1 between the front end portion 5a of the door panel 5 and the facing portion 4a of the door opening 4. As shown in FIG. 8, the capacitance C1 detected using the outer electrode 52 at the time of the closing operation of the door panel 5 gradually becomes greater as the door panel 5 approaches the fully closed position Pc after the door panel 5 has been positioned in a predetermined position in the vicinity of the fully closed position Pc. This is because the capacitance between the facing portion 4a of the door opening 4 and the outer electrode 52 increases when the front end portion 5a of the door panel 5 approaches the facing portion 4a of the door opening 4. Therefore, a number of threshold values are set in accordance with the position of the door panel 5.

Thus, the determination section 45 compares the result of measurement, which is initially inputted from the capacitance detecting section 43 after the pulse number of the position detection signal has switched, with the threshold value, and determines that there are no objects between the front end portion 5a of the door panel 5 and the facing portion 4a of the door opening 4 in the case where the result of measurement is the threshold value or less. Meanwhile, in the case where the result of measurement is greater than the threshold value, it is determined that there is a foreign object X1 between the front end portion 5a of the door panel 5 and the facing portion 4a of the door opening 4. The determination section 45 outputs a foreign object detection signal which indicates that there is a foreign object between the front end portion 5a and the door opening 4 to the control circuit device 101.

When a voltage detection signal is inputted from the pressure detecting section 44, the determination section 45 determines that there is a foreign object X1 or a foreign object X2 between the front end portion 5a of the door panel 5 and the facing portion 4a of the door opening 4 on the basis of the input of the voltage detection signal. The determination section 45 outputs a foreign object detection signal which indicates that there is a foreign object between the front end portion 5a and the door opening 4 to the control circuit device 101.

The above described control circuit device 101 is placed inside the door panel 5 and the power is supplied from the battery 102 of the vehicle 2. This control circuit device 101 controls the slide actuator 25 and the closure actuator 28 in accordance with various types of signals inputted from the above described half latch detecting section, position detecting device 27, operation switch 31 and foreign object detection sensor 41.

That is to say, the control circuit device 101 controls the slide motor 26 so that the door panel 5 is operated in order to open to the completely open position Po when an opening signal is inputted from the operation switch 31, and the door panel 5 is operated in order to be closed to the completely closed position Pc when a closing signal is inputted from the operation switch 31 (see FIG. 2). The control circuit device 101 controls the closure motor 29 so that the door panel 5 moves to the position where it is possible for the locking mechanism to lock when a half latch detection signal is inputted from the above described half latch detecting section. The control circuit device 101 detects the position of the door panel 5 on the basis of the position detection signal inputted from the position detecting device 27, and at the same time, controls the speed of the door panel 5 in accordance with the position of the door panel 5. The control circuit device 101 outputs a drive signal to the effect that the slide motor 26 moves the door panel 5 to the completely open position Po when a foreign object detection signal is inputted from the determination section 45 of the foreign object detection sensor 41 during the closing operation of the door panel 5.

Next, the operation of the electric sliding door apparatus 1 is described.

When an opening signal is inputted from the operation switch 31, the control circuit device 101 outputs a drive signal to the slide motor 26 so that the door panel 5 initiates the opening operation. When the door panel 5 is positioned in the completely open position Po, the control circuit device 101 stops the slide motor 26.

Figure 9:
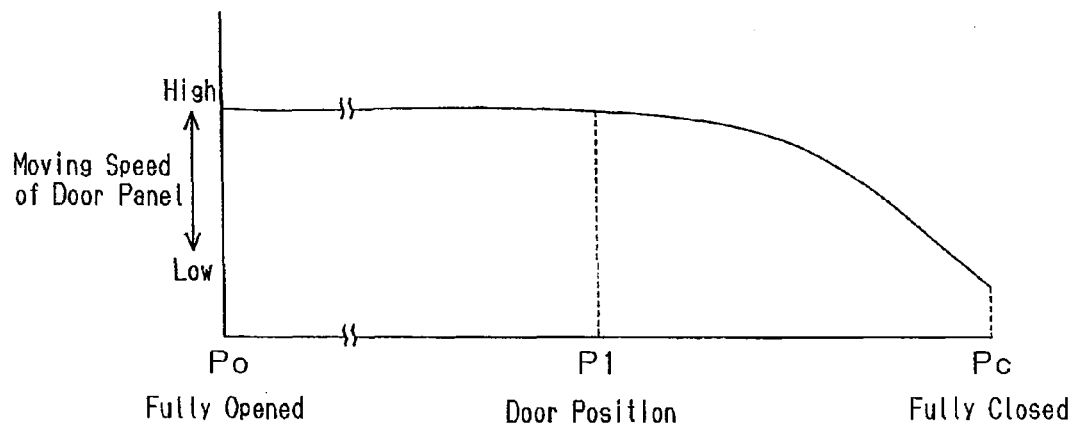
FIG. 9 is a graph showing the relationship between the position of the door panel and the velocity of the door panel during the closing operation.

When a closing signal is inputted from the operation switch 31, the control circuit device 101 outputs a drive signal to the slide motor 26 so that the door panel 5 initiates the closing operation. At this time, the control circuit device 101 controls the slide motor 26 so that the door panel 5 moves at the maximum moving speed (250 mm/s in the present embodiment) in the case where, as shown in FIG. 9, the door panel 5 is moving in a range from the completely open position Po to a first door position P1, which is set between the completely open position Po and the completely closed position Pc. When it is determined on the basis of the position detection signal that the door panel 5 is positioned at the first door position P1, the control circuit device 101 controls the slide motor 26 so that the moving speed of the door panel 5 gradually becomes lower. When the door panel 5 is positioned in a certain position immediately before the completely closed position Pc, a half latch detection signal is inputted from the half latch detecting section to the control circuit device 101. Then, the control circuit device 101 drives the closure motor 29 so that the closure motor 29 locks the door panel 5 and positions the door panel 5 in the completely closed position Pc. When the door panel 5 is positioned in the completely closed position Pc, the control circuit device 101 stops the closure motor 29.

As shown in FIG. 3, when a closing signal is inputted from the operation switch 31, the control circuit device 101 drives the foreign object detection sensor 41. Then, the determination section 45 stores the result of measurement (number of times that the clock signal corresponding to the oscillating signal for 20,000 cycles rises) inputted from the capacitance detecting section 43 for each measurement period T1 in association with the pulse number of the position detection signal (see FIGS. 6 and 7).

The determination section 45 compares the result of measurement initially inputted from the capacitance detecting section 43 with the threshold value for determining whether there is a foreign object X1 in close proximity to the main sensor body 42 after the pulse number of the position detection signal has been switched. In the case where the result of measurement is greater than the threshold value, the determination section 45 determines that there is a foreign object X1 between the front end portion 5a of the door panel 5 and the facing portion 4a of the door opening 4 and outputs a foreign object detection signal to the control circuit device 101. When a voltage detection signal is inputted from the pressure detecting section 44, the determination section 45 determines that there is a foreign object X1 or a foreign object X2 between the front end portion 5a of the door panel 5 and the door opening 4 and outputs a foreign object detection signal to the control circuit device 101.

When a foreign object detection signal, which indicates that there is a foreign object X1 or a foreign object X2 between the front end portion 5a of the door panel 5 and the door opening 4, is inputted irrespective of the position of the door panel 5, the control circuit device 101 controls the slide motor 26 so that the door panel 5 moves to the completely open position Po.

The present embodiment has the following advantages.

(1) The oscillating signal outputted from the oscillating circuit 81 is a signal having an oscillating frequency which is set in accordance with the capacitance C1 detected using the outer electrode 52. The capacitance detecting section 43 measures the time which is required for the oscillating signal for 20,000 cycles to be outputted within a predetermined measurement period T1, and outputs this result of measurement to the determination section 45 whenever the period T1 elapses. The capacitance detecting section 43 always outputs the time for the oscillating signal for 20,000 cycles to be outputted as a result of measurement, and therefore, the outputted results of measurement have equal precision. The capacitance detecting section 43 measures and outputs the time which is required for the oscillating signal for 20,000 cycles to be outputted. Therefore, the actual value of the capacitance C1 detected using the outer electrode 52 is reflected in the result of measurement with high precision in comparison with the case where the time which is required for the oscillating signal for one cycle to be outputted is measured. As a result of the above, the precision in the detection of the capacitance C1 detected using the outer electrode 52 is increased.

The foreign object detection sensor 41 is provided with the pressure detecting section 44, the insulating layer 53, the electrode wires 54a to 54d and the resistor 57, and therefore, even in the case where there is a foreign object X2 having no conductivity between the front end portion 5a and the facing portion 4a, the foreign object X2 can be detected. The determination section 45 determines on the basis of the input of a voltage detection signal that there is a foreign object X1 (or a foreign object X2) between the front end portion 5a of the door panel 5 and the facing portion 4a of the door opening 4. Furthermore, the measurement period T1 is set shorter than the response time T2 that it takes from when the foreign object X1 or the foreign object X2 makes contact with the support portion 62 for holding the main sensor body 42 (see FIG. 4A) in the case where the door panel 5 moves at the maximum moving speed to when the pressure detecting section 44 outputs a voltage detection signal. Accordingly, even in the case where the time which is required for the oscillating signal for 20,000 cycles to be outputted starts being measured by the capacitance detecting section 43 at the same time as the foreign object X1 makes contact with the support portion 62 for holding the main sensor body 42, the result of measurement is outputted before the pressure detecting section 44 outputs a voltage detection signal for the foreign object X1. Therefore, the determination section 45 can determine on the basis of this result of measurement whether there is a foreign object X1 between the front end portion 5a and the facing portion 4a, and thus, it becomes possible to detect that there is a foreign object X1 on the basis of the result of measurement before the foreign object X1 is detected on the basis of the voltage detection signal. As a result, a large load can be prevented from being applied to the foreign object X1 from the door panel 5.

(2) The determination section 45 compares the result of measurement initially inputted from the capacitance detecting section 43 with the threshold value for determining whether there is a foreign object in close proximity to the main sensor body 42 after the pulse number of the position detection signal has been switched, and determines whether there is a foreign object X1 between the front end portion 5a of the door panel 5 and the facing portion 4a of the door opening 4 on the basis of this comparison result. Accordingly, the time which is required for determination is shortened in comparison with the case where, for example, whether there is a foreign object X1 between the front end portion 5a and the facing portion 4a is determined by comparing the average value of a number of results of measurement with a threshold value. Therefore, in the case where there is a foreign object X1 between the front end portion 5a and the facing portion 4a, this object X1 is detected earlier.

(3) The first counter 82 measures the number of times that the oscillating signal rises to 20,000, and at the same time, the second counter 84 measures the number of times that the clock signal outputted from the reference clock generating circuit 83 while the oscillating signal for 20,000 cycles is being outputted rises, and thus, the capacitance detecting section 43 measures the time that it takes for the oscillating signal for 20,000 cycles to be outputted. Therefore, the precision in the result of measurement increases even when the clock frequency of the reference clock generating circuit 83 is relatively small in comparison with the case where the time that it takes for the oscillating signal for one cycle to be outputted is measured. As a result, the cost for the capacitance detecting section 43 is prevented from increasing.

The embodiment of the present invention may be modified as follows.

Figure 10:
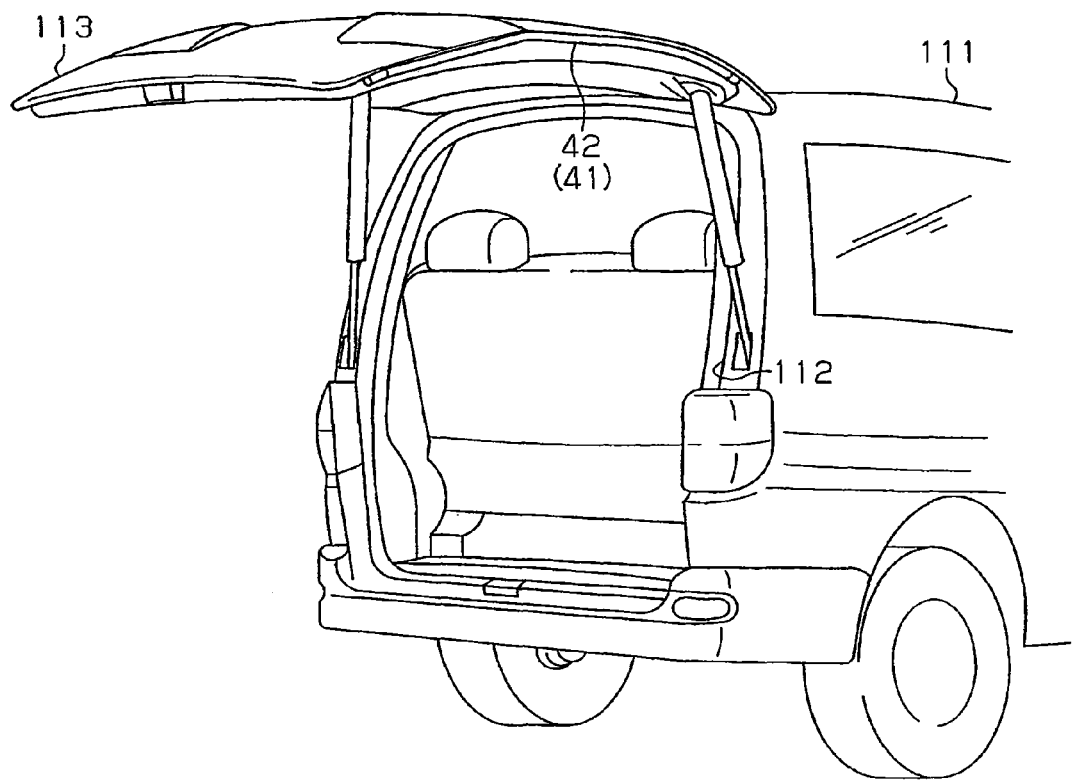
FIG. 10 is a perspective view showing a vehicle provided with a back door apparatus having a foreign object detection sensor.

The foreign object detection sensor 41 may be provided in an opening and closing apparatus other than the electric sliding door apparatus 1. As shown in FIG. 10, for example, the foreign object detection sensor 41 may be provided in a rear hatch apparatus for the opening and closing operation of a rear hatch 113, which is a movable body for opening and closing an opening 112 provided in the rear of a vehicle 111 by means of the driving force of a motor or the like. In this case, the main sensor body 42 is placed in at least a portion of the peripheral portion on the side of the rear hatch 113 facing the opening 112. In addition, the foreign object detection sensor 41 may be provided in a sunroof apparatus for the opening and closing operation of a roof opening and closing body with which the opening provided in the ceiling portion of a vehicle is opened and closed by means of the driving force of a motor or the like. In this case, the main sensor body is placed in a portion of the peripheral portion of the roof opening and closing body facing the peripheral portion of the opening. Furthermore, the foreign object detection sensor 41 may be provided in an opening and closing apparatus for the opening and closing operation of the decklid provided in the rear portion of a vehicle by means of a driving force of a motor or the like.

According to the above described embodiment, the position detecting device 27 is formed of a permanent magnet (not shown), which rotates together with the rotary shaft (not shown) of the slide motor 26 or a reduction gear (not shown) in the gear reduction mechanism which forms the slide actuator 25, and a Hall IC (not shown) which is placed so as to face this permanent magnet. However, the position detecting device 27 is not limited to one having this configuration as long as it outputs a pulse signal as a position detection signal in accordance with the position of the door panel 5. The position detecting device 27 may be formed of, for example, a pulse plate which rotates together with a reduction gear which forms the gear reduction mechanism of the slide actuator 25 and a sensor brush which slides against this pulse plate, and thus, outputs a pulse signal in accordance with the rotation of the reduction gear to the control circuit device 101.

The measurement period T1 may be set to a time shorter than the response time T2. The measurement period T1 is set to a time which allows the time required for an oscillation signal of at least two cycles to be outputted to be measured. In addition, the value of the capacitance C1 detected using the outer electrode 52 can be reflected with high precision in the results of measurement outputted by the capacitance detecting section 43, by making the number of cycles in the oscillating signal measured within the measurement period T1 as many as possible.

The number of cycles in the oscillating signal may be measured by measuring the number of cycles that the oscillating signal falls or both the number of times that the oscillating signal rises and the number of times that it falls. In addition, although the second counter 84 measures the number of times that the clock signal rises, it may measure the number of times that the clock signal falls, or both the number of times that the clock signal rises and the number of times that it falls.

The determination method is not limited to the method described in the above embodiment, as long as the determination section 45 determines whether there is a foreign object X1 between the front end portion 5a of the door panel 5 and the facing portion 4a of the door opening 4 on the basis of the results of measurement outputted by the capacitance detecting section 43. The determination section 45 may be formed so that, for example, the value of the capacitance C1 is calculated on the basis of the results of measurement inputted from the capacitance detecting section 43, and whether there is a foreign object X1 between the front end portion 5a of the door panel 5 and the facing portion 4a of the door opening 4 can be determined by comparing the calculated value with the threshold value. In this case, the threshold value is set on the basis of the actual change in the capacitance C1 detected using the outer electrode 52 in the case where the door panel 5 is in the closing operation in such a state that there is no object X1 between the front end portion 5a of the door panel 5 and the facing portion 4a of the door opening 4. In addition, the determination section 45 may be formed so as to calculate the average cycle in the oscillating signal on the basis of the results of measurement inputted from the capacitance detecting section 43 and compare the calculated value with the threshold value, so that whether there is a foreign object X1 between the front end portion 5a of the door panel 5 and the facing portion 4a of the door opening 4 can be determined. In this case, the threshold value is set on the basis of the actual change in the cycle of the oscillating signal outputted from the oscillating circuit 81 in the case where the door panel 5 is in the closing operation in such a state that there is no object X1 between the front end portion 5a of the door panel 5 and the facing portion 4a of the door opening 4.

In the above described embodiment, the determination section 45 determines whether there is a foreign object X1 between the front end portion 5a of the door panel 5 and the facing portion 4a of the door opening 4 by comparing the results of measurement initially inputted from the capacitance detecting section 43 with the threshold value for determining whether there is a foreign object in close proximity to the main sensor body 42 after the pulse number of the position detection signal is switched during the closing operation of the door panel 5. However, the determination section 45 may be formed so as to determine whether there is a foreign object X1 between the front end portion 5a of the door panel 5 and the facing portion 4a of the door opening 4 by comparing the results of measurement outputted by the capacitance detecting section 43 immediately before the pulse number is switched with the threshold value whenever the pulse number of the position detection signal is switched. In addition, the determination section 45 determines whether there is a foreign object X1 between the front end portion 5a of the door panel 5 and the facing portion 4a of the door opening 4 by comparing the results of one measurement with the threshold value. In the case where the results of a number of measurements are inputted during the time after the pulse number has been switched and before the pulse number is next switched, however, the determination section 45 may determine whether there is a foreign object X1 between the front end portion 5a of the door panel 5 and the facing portion 4a of the door opening 4 by comparing the average value of the results of measurement with the threshold value. By doing so, the precision in detection of a foreign object X1 between the front end portion 5a and the facing portion 4a is increased in comparison with the case where whether there is a foreign object X1 is determined on the basis of the results of one measurement.

The configuration of the main sensor body 42 is not limited to the configuration of the above described embodiments. The outer electrode 52, for example, may be formed by covering the outer periphery of the insulating layer 53 with conductive intertwined wires. In addition, the main sensor body 42 may have a configuration where pressure sensitive rubber in cylindrical form having such properties that when a pressing force is applied to the rubber, the rubber is elastically changes in form, making the resistance value lower, is provided inside the outer electrode 52 in cylindrical form provided inside the external cover 51, and furthermore, a conductive core electrode is placed in the center portion of the pressure sensitive rubber in the direction of the diameter. In this case, a current is supplied to the outer electrode 52 via the capacitance detecting section 43, and at the same time, the core electrode is electrically connected to a current detecting element which is provided so as to replace the pressure detecting section 44. Then, the resistance value of the pressure sensitive rubber becomes lower due to the elastic change in the form of the pressure sensitive rubber when a pressing force is applied to the main sensor body 42, of which the form then elastically changes, and a current starts flowing from the outer electrode 52 to the core electrode via the pressure sensitive rubber. The above described current detecting element outputs a current detection signal (contact detection signal) indicating that a current flows between the outer electrode 52 and the core electrode via the pressure sensitive rubber to the determination section 45. When a current detection signal is inputted, the determination section 45 determines that there is a foreign object X1 or a foreign object X2 between the front end portion 5a of the door panel 5 and the facing portion 4a of the door opening 4 on the basis of the input of the current detection signal, and outputs a foreign object detection signal to the control circuit device 101.

The protector 61 for supporting the main sensor body 42 may be secured directly to the front end portion 5a of the door panel 5. The protector 61 may, for example, be secured to the end portion of the extending portion 73 coated with the cover 74, and thus, placed along the front end portion 5a of the door panel 5.

What is claimed is:

1. A foreign object detection sensor applied to an opening and closing apparatus, wherein the opening and closing apparatus includes a movable body for opening and closing an opening created in a stationary body, wherein the movable body has a closing end portion, which is the front side of the movable body relative to the direction of movement at the time of the closing operation, and the opening has a facing portion which faces the closing end portion, and the foreign object detection sensor comprises:
    a sensor electrode placed in the closing end portion;
    an oscillating section for outputting an oscillation signal having an oscillation frequency which is set in accordance with the capacitance between the sensor electrode and an conductive foreign object in close proximity to the sensor electrode;
    a contact detecting section, which is placed in the closing end portion and has a pressure sensitive portion which is capable of elastically changing in form through contact with a foreign object, wherein the contact detecting section outputs a contact detection signal when the pressure sensitive portion elastically changes in form by a predetermined amount;
    a change detecting section for detecting a change in the oscillation frequency on the basis of the oscillation signal, wherein the change detecting section sets a measurement period, the measurement period being shorter than a response time from when the foreign object contacts the pressure sensitive portion to when the contact detecting section outputs the contact detection signal in the case where the movable body is in the closing operation at a predetermined maximum moving speed, and wherein the change detecting section measures the time required for the oscillation signal for a predetermined number of cycles, which number is two or greater, to be outputted within the measurement period, and outputs the result of measurement every time the measurement period elapses; and
    a determination section for determining whether there is a foreign object between the closing end portion and the facing portion on the basis of a result of measurement by the change detecting section, wherein the determination section determines that there is a foreign object between the closing end portion and the facing portion when the contact detection signal is inputted into the determination section.

2. The foreign object detection sensor according to claim 1, further comprising a position detecting section for outputting a position detection signal in accordance with the position of the movable body,
    wherein the determination section repeatedly detects that the movable body has moved by a predetermined distance on the basis of the position detection signal, and wherein, after detecting that the movable body has moved by a predetermined distance, the determination section compares the result of measurement initially outputted by the change detecting section with a predetermined threshold value, and determines whether there is a foreign object between the closing end portion and the facing portion on the basis of the result of the comparison.

3. The foreign object detection sensor according to claim 1, further comprising a position detecting section for outputting a position detection signal in accordance with the position of the movable body,
    wherein the determination section repeatedly detects that the movable body has moved by a predetermined distance on the basis of the position detection signal, and wherein, in the case where the change detecting section outputs a number of results of measurement while the movable body moves by a predetermined distance, the determination section compares with a predetermined threshold value the average value of the number of results of measurement outputted by the change detecting section while the movable body moves by a predetermined distance, and determines whether there is a foreign object between the closing end portion and the facing portion on the basis of the result of the comparison.

4. The foreign object detection sensor according to claim 1, wherein the stationary body is a vehicle body, the opening is provided in a side portion of the vehicle body, the movable body is a door panel which is slidable in the front-rear direction of the vehicle body, and the pressure sensitive portion extends along the closing end portion of the door panel.

5. The foreign object detection sensor according to claim 1, wherein the stationary body is a vehicle body, the opening is provided in the rear portion of the vehicle body, the movable body is a rear hatch, and the pressure sensitive portion is placed in at least a portion of the periphery portion of the rear hatch.

6. A foreign object detecting method applied to an opening and closing apparatus, wherein the opening and closing apparatus includes a movable body for opening and closing an opening created in a stationary body, the movable body has a closing end portion, which is the front side of the movable body relative to the direction of movement at the time of the closing operation, and the opening has a facing portion which faces the closing end portion, the object detecting method comprising:
    outputting an oscillation signal having an oscillation frequency which is set in accordance with the capacitance between a sensor electrode placed in the closing end portion and a conductive foreign object in close proximity to the sensor electrode;
    outputting a contact detection signal when a pressure sensitive portion, which is placed in the closing end portion and is capable of elastically changing in form through contact with a foreign object, elastically changes in form by a predetermined amount;
    setting a measurement period, the measurement period being shorter than a response time from when the foreign object contacts the pressure sensitive portion to when the contact detection signal is outputted in the case where the movable body is in the closing operation at a predetermined maximum moving speed;

measuring the time required for the oscillation signal for a predetermined number of cycles, which number is two or greater, to be outputted within the measurement period;

outputting the result of measurement every time the measurement period elapses;

determining whether there is a foreign object between the closing end portion and the facing portion on the basis of the result of measurement; and determining that there is a foreign object between the closing end portion and the facing portion when the contact detection signal is outputted.

* * * * *